Aug. 22, 1961          H. JÄGER          2,997,612
SELF STARTING SYNCHRONOUS MOTOR
Filed Oct. 3, 1958          2 Sheets-Sheet 1
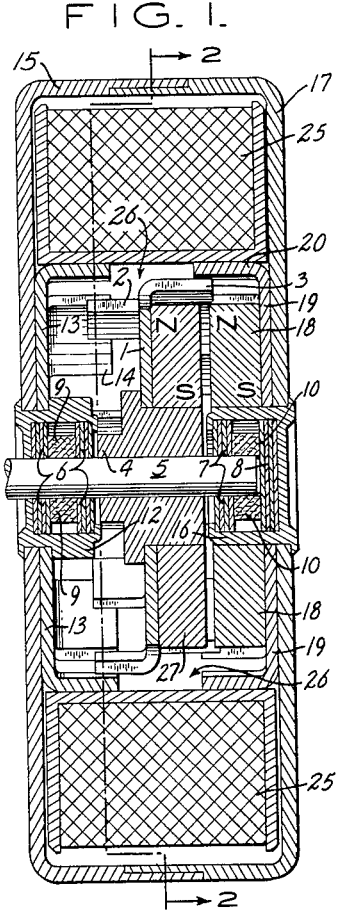
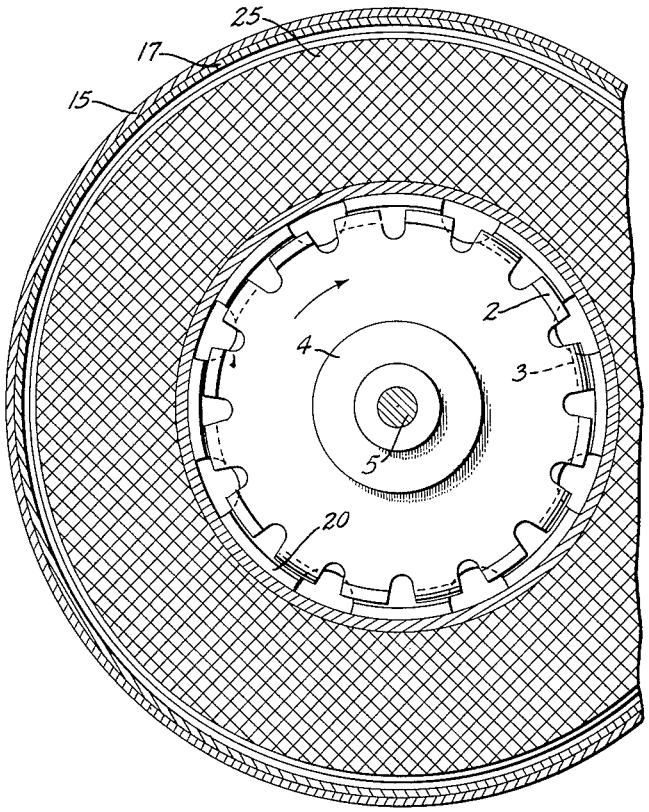
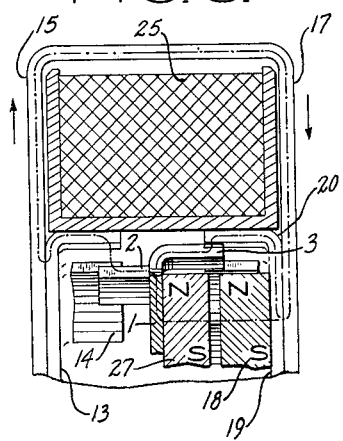
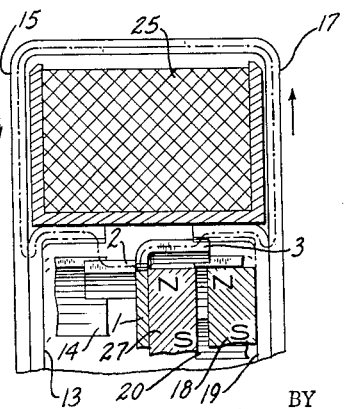
INVENTOR.
HANS JÄGER
BY
Morgan, Finnegan, Durham & Pine
ATTORNEYS Aug. 22, 1961     H. JÄGER     2,997,612
SELF STARTING SYNCHRONOUS MOTOR
Filed Oct. 3, 1958     2 Sheets-Sheet 2

INVENTOR.
HANS JÄGER
BY Morgan, Finnegan, Durham & Pine
ATTORNEYS

2,997,612
SELF STARTING SYNCHRONOUS MOTOR
Hans Jäger, Zug, Switzerland, assignor to Landis & Gyr A.G., Zug, Switzerland, a body corporate of Switzerland
Filed Oct. 3. 1958, Ser. No. 765,247
Claims priority, application Switzerland Oct. 23, 1957
13 Claims. (Cl. 310—164)

This invention relates to electric motors and more specifically to a novel and improved self-starting synchronous motor particularly adaptable for use in small motor applications requiring, among other characteristics, high efficiency, light weight, rapid starting, low speed and dependability.

The objects and advantages of the invention will be set forth in part hereinafter and in part will be obvious herefrom, or may be learned by practice with the invention, the same being realized and attained by means of the parts, combinations and steps pointed out in the appended claims.

The invention consists in the novel steps, construction arrangements, combinations and improvements herein shown and described.

The accompanying drawings referred to herein and constituting a part hereof, illustrate several embodiments of the invention, and, together with the description, serve to explain the principles of the invention.

In the drawings:

FIGURE 1 is a cross sectional view of a motor in accordance with one embodiment of the invention;

FIGURE 2 is a cross sectional view of FIGURE 1 taken along the line 2—2 of FIGURE 1;

FIGURE 3 is a fragmentary portion of FIGURE 1 showing the permanent magnet flux path;

FIGURE 4 is a view similar to FIGURE 3 showing alternating current flux path;

Figure 5:
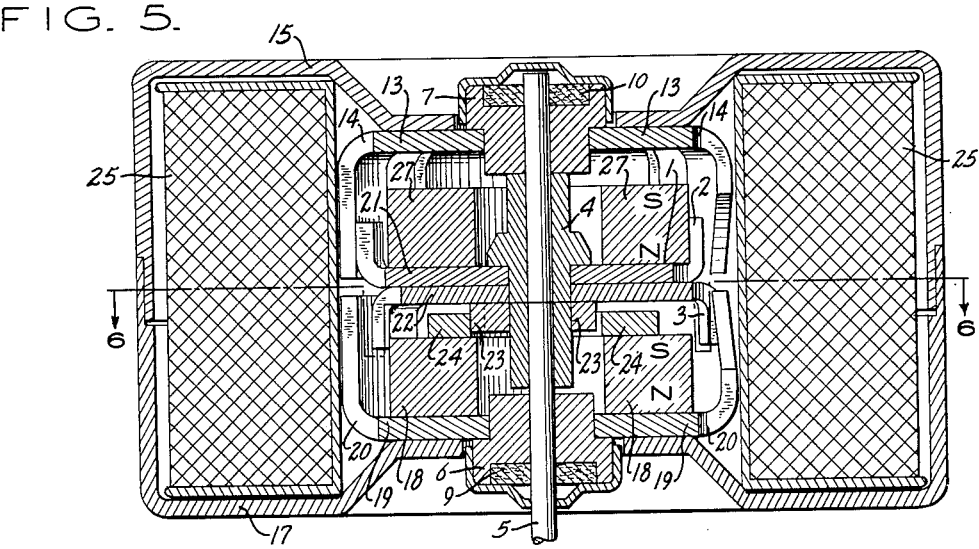
FIGURE 5 is a cross sectional view of another embodiment of the invention.

Self-starting synchronous motors are used for many purposes as, for example, time measuring devices, registering devices, computing apparatus and the like. While the operating characteristics that may be required in the above and other applications often differ widely, it is important that the motors be relatively inexpensive, easy to manufacture, compact and dependable. In computing and time measuring devices, it is often necessary that small motors attain their synchronous speed as quickly as possible and to attain this end the rotors must be light in weight and the bearing friction must be maintained at a minimum. These and other advantages are obtained with novel and improved synchronous motors in accordance with the invention which does not require complicated operating circuits in order to obtain the self-starting feature. Furthermore, the invention affords a compact structure of easily fabricated elements that will operate for extended periods of time without the need for periodic lubrication or other maintenance.

Many types of synchronous motors have been proposed but they have not been found to be satisfactory for many reasons. For instance, many motors require complicated energizing networks and stator and rotor structures to effect the desired self-starting characteristics. Certain of these prior motors, while including both a permanent magnet and an A.C. current field, will not start automatically in a given direction and the fields are so arranged hat the A.C. flux operates as a demagnetizing influence on the permanent magnet, which materially limits the life and efficiency of the motor. Still other prior motors rely solely on stray fluxes to produce the desired rotor torque, which reduces both the efficiency and the starting torque of the motor to a point where extended times may be required for the motor to attain synchronous speed.

Efforts have been made to improve certain operating characteristics of small motors by the addition of larger magnets and other devices to the rotor. Such additions, however, materially increase the mass of the rotor with the result that while certain advantages are gained, other important advantages such as rapid starting, low cost, compactness and trouble-free operation for extended periods are sacrificed.

The motor in accordance with this invention overcomes the disadvantages of prior known motors and while utilizing the combination of a permanent magnet and an electromagnet to effect rotation of the rotor, the rotor is exceedingly light so that rotation can be initiated almost instantaneously. At the same time the magnetic fields are so arranged and coordinated that the A.C. electromagnetic field will not have a depolarising effect on the permanent magnets. This arrangement provides a motor that has long life and affords a rugged, durable structure. In addition, the improved coordination of the two fields are so arranged and coordinated that rotary motion is effected by the interaction of the two fields rather than the effects of stray fluxes. In this way, exceedingly high efficiencies are obtained with a high degree of starting torque.

The above and other advantages and objects of the invention will become more apparent in the description of the embodiment of the invention shown in the figures.

Referring first to FIGURE 1 illustrating one embodiment of the invention, the rotor 1 is in the form of a disc made of soft iron or other equivalent material and is provided with a plurality of teeth 2 and 3 formed parallel to the axis of the disc and alternately deflected in opposite directions. In FIGURE 1 the teeth 2 are deflected to the left, while the teeth 3 are deflected to the right. The rotor 1 is carried by a hub 4, the latter being fixedly secured to a shaft 5 for rotation within the housing comprising a pair of interconnected cup-shaped elements denoted by the numerals 15 and 17.

The hub 4 forming part of the rotary assembly is formed of a non-magnetic material and the shaft 5 is carried by a pair of bearings 6 and 7 carried by bushings 12 and 16 which are secured to the housing elements 15 and 17 respectively. Felts 9 and 10 within bushings 12 and 16 respectively, are provided for lubrication of the shaft 5 and the bushing 16 further includes a thrust bearing 8 so that the motor can be operated with the shaft 5 in a vertical position.

The motor stator comprises, in addition to the case elements 15 and 17 a pair of disc-like elements 13 and 19 of magnetic material which lie flat against the walls of the case. The stator element 13 is provided with a plurality of inwardly formed teeth or pole pieces 14 and is held in position by the bushing 12 which extends through openings in the element 13 and the case part 15, and is flanged over the outer surface to secure the stator element 13 to the case part 15. The stator element 19 is formed in a manner similar to element 13 and has a plurality of inwardly formed teeth or pole pieces 20. The stator element 19 is secured to the wall of the casing part 17 by means of the bushing 16 which extends through cooperating openings in the stator element 19 and the casing part 17 and is flanged over the outer surface in the manner described with bushing 12. The bushing 12 and 16 actually retain the bearing 6 and 7 previously described and therefore support the rotor 1 centrally of the housings 15 and 17.

The stator poles 14 and 20 are aligned so that each tooth 14 of the stator element 13 is directly opposite and centered with a corresponding tooth 20 on the stator element 19. Each set of teeth or poles 2 and 3 on the rotor correspond in number to and lie within their cooperating set stator poles 14 and 20 respectively and are in overlapping relationship therewith. The spacing between the rotor and the stator poles is maintained at a minimum consistent with manufacturing tolerances so that the rotor 1 can rotate freely within the stator structure. As will be observed in FIGURE 2 the stator poles 14 and 20 are substantially wider than the rotor teeth 2 and 3.

The rotor 1 carries a permanent magnet 27 of annular configuration that is cemented or otherwise secured to the rotor about the hub 4. This magnet is preferably made of a material having a high coercive force, as for example, magnets formed of oxide materials. One such material is sold under the trademark Ferroxdure which has a coercive force of about 1500 Oersteds and a reversible permeability of about 1. The stator element 19 also includes an annular permanent magnet 18 of the same size and dimensions of the magnet 27. The magnet 18 surrounds the bushing 16 and is cemented or otherwise secured to the stator element 19 as illustrated. Both permanent magnets 18 and 27 are magnetized axially with the right hand surface of each magnet as illustrated in FIGURE 1 forming a south pole and the left hand surface forming a north pole. The continuous magnetic field provided by these magnets magnetizes the rotor teeth 2 and 3 in the same direction and provides two individual flux paths, as illustrated in FIGURE 3 in dot and dash lines.

Referring to FIGURE 3, it will be observed that the flux leaving the north pole or left hand surface of the magnet 27 flows outwardly through rotor disc 1. A portion of this flux flows through the rotor teeth 3, thence into the stator teeth 20 and returns to the right hand or south pole of the magnet 18. The magnets 18 and 27 while constituting individual magnets, the axial polarization causes them to have the effect of a single magnet even though one magnet may be rotated relative to the other. A second portion of the flux from the magnet 27 passes through the rotor teeth 2, thence into the stator teeth 14. The flux then flows through the casing parts 15 and 17 as illustrated, and returns to magnet 18 through a wall of the stator element 19.

Surrounding the rotor and stator construction previously described is an exciting coil generally denoted by the numeral 25. This coil is wholly enclosed by the casing element 15 and 17 and when energized produces an A.C. current flux that circulates in a path shown by the dot and dash lines in FIGURE 4. This A.C. flux path, with current flowing in one direction in the coil 25, as indicated by the arrows, includes casing parts 17 and 15, the stator pole 14, the rotor poles 2 and 3, and the stator pole 20.

As will become apparent from the description of the operation of this motor, it is possible to start rotation of the rotor 1 in either direction. In order to restrict the motor to rotation in a single direction, a reverse locking mechanism of the type illustrated in FIGURE 6 may be employed.

In the operation of the motor described above, and with the coil 25 in a deenergized condition, the rotor 1 is influenced solely by the permanent magnets 18 and 27 and the rotor teeth 2 and 3 will assume the positions as shown in FIGURE 2 relative to the stator teeth 14 and 20. It will be observed that the angular width of the stator teeth 14 and 20 is slightly narrower than the combined angular width of a pair of adjoining rotor teeth 2 and 3. The permanent magnetic flux will therefore position the teeth 2 and 3 relative to the teeth 14 and 20 respectively so that a balanced position will be obtained wherein the teeth 2 and 3 substantially uniformly underlie cooperating stator teeth 14 and 20. Upon application of an A.C. current to the coil 25 an A.C. field is produced which circulates between the stator and rotor as shown in FIGURE 4. Since the reversible permeability of the permanent magnets 18 and 27 is preferably about 1, these magnets form little, if any, path for the alternating lines of force produced by the coil 25.

With the initial excitation phase of the coil 25 in a direction to produce flux flow as shown in FIGURE 4, the A.C. field between the rotor and stator teeth 3 and 20, is not diminished or reduced but the A.C. current field between the rotor and stator teeth 2 and 14 will be reduced inasmuch as the two sets of fluxes are flowing in opposite directions between these teeth. This action will cause the rotor 1 to move into an angular position in which the rotor teeth 3 and the stator teeth 20 are symmetrically aligned. Inasmuch as the motor includes a reversed locking mechanism, should the initial excitation phase have been in the opposite direction, which would normally cause the rotor to move in the opposite direction, the rotary motion will not take place until the exciting current has reversed its polarity. After the initial movement of the rotor, the teeth 2 are positioned between adjoining stator poles 14 and with a change in phase of the exciting current the A.C. flux and permanent magnet flux between poles 2 and 14 will add. This causes each tooth 2 to become symmetrical with its next successive stator pole 14. In this way successive alterations of the A.C. field produces continued rotation of the rotor 1.

Figure 6:
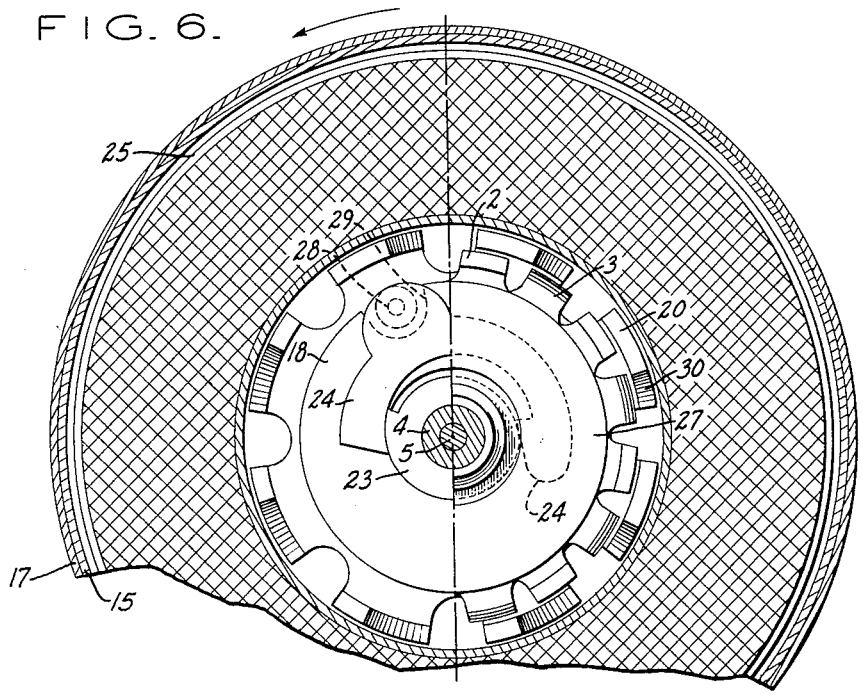
FIGURE 6 is a cross sectional view of FIGURE 5 taken along the line 6—6 thereof.

A modified embodiment of the invention is illustrated in FIGURES 5 and 6 of the drawings. In this embodiment the rotary element 1 consists of two disks 21 and 22 of magnetic material with the disk 21 having axially formed teeth or pole pieces 2 corresponding to the pole pieces 2 of the rotor of FIGURE 1. The disk 22 is formed with pole pieces 3 which correspond to the pole pieces 3 of FIGURE 1. The stators, case, field coil, shaft and shaft bearing elements are substantially identical to those illustrated and described in connection with the embodiment shown in FIGURE 1 and accordingly like numerals have been utilized to identify these corresponding elements of FIGURES 1 and 5. It will be observed, however, that stator poles 14 and 20 of the embodiment of FIGURE 5 may be inclined inwardly toward the shaft 5 as shown in the case of the poles to the right of the shaft 5.

The two rotor elements 21 and 22 are fixedly secured to a common hub 4 carried by the shaft 5. The permanent magnet 18 is affixed to the inner surface of the stator element 19 while the permanent magnet 27 is fixed to the face of the rotor disk 21. This places the permanent magnets on opposite sides of the rotor as distinguished from the structure shown in FIGURE 1.

While each stator 13 and 19 have teeth 14 and 20 corresponding in number to the teeth 2 and 3 of the rotor elements 21 and 22, the stator teeth are made somewhat narrower than the stator teeth shown in the embodiment of FIGURE 1. Furthermore, the stator teeth or poles 14 and 20 are offset by an amount denoted by the numeral 30 of FIGURE 6 and this tooth configuration and alignment facilitates initiation of rotation in the direction as indicated by the arrow in FIGURE 6. The operation of this motor is substantially identical to the operation of the motor illustrated in FIGURES 1 and 2.

A reverse locking mechanism is illustrated in FIGURE 6 and includes a spiral cam 23 and a pawl 24, the latter being pivoted at a point within the central opening of the magnet 18. The cam 23 is carried by the shaft 4 and rotates within the pawl 24. Should the shaft 5 be rotated in a clockwise direction as shown in FIGURE 6, the cam tooth will engage the pawl to prevent rotation. During counterclockwise rotation the cam 23 cannot engage the pawl 24 and the locking mechanism will therefore permit continued operation of the motor in the preferred direction.

In the foregoing embodiments of the invention, a double magnet arrangement has been illustrated. It is apparent, however, that provision may be made for the use of three or more magnets as, for example, the embodiment shown in FIGURE 1 may utilize additional magnets to the left of the rotor 1 and these magnets would be polarized to form, in effect, a mirror image of the magnets 18 and 27. The utilization of such additional magnets tends to balance the rotor structure and equalize the forces on the shaft-supporting bearings. In any event, the arrangement of the magnets should be such as to insure the desired balance between the inertia of the rotor unit and the required torque.

Figure 7:
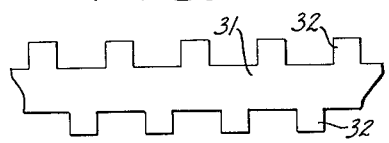
FIGURE 7 is a detailed view of a modified rotor component.

If desired, and as illustrated in FIGURE 7, the motor in accordance with the invention may be made by forming the teeth 2 and 3 from a circular band of material 31, having teeth 32 and then securing the latter to a disc for attachment to the shaft 5 in any suitable manner. It is also possible to provide at least one of the permanent magnets with a radial polarization and produce the flux paths as shown in FIGURES 3 and 4.

With the motor in accordance with the invention, the weight of the permanent magnetic system is distributed so that only a portion thereof is carried by the rotary element. This reduces the inertia of the rotary element and enables it to attain synchronous speed more rapidly. Furthermore, by coordinating the amplitude of the alternating flux in the air gaps so that it is substantially equal to the flux provided by the continuous field, high efficiencies and starting torques can be attained.

Another advantage of the motor in accordance with the invention is that the entire operating structure, including the stator and rotor assemblies, is contained wholly within the field coil and the utilization of a case of magnetic material surrounding the entire construction provides a highly compact and shielded structure that will produce little, if any, stray magnetic fields in the immediate area. Furthermore, the particular arrangement and coordination of the alternating and continuous fields materially reduces the effect of the A.C. current field on the permanent magnets and insures long, dependable life.

Another advantage of this invention is evident from the arrangement of the stator poles and the rotor poles which utilizes substantially the entire A.C. current flux to effect rotary motion. It will be observed that the stator teeth 14 and 20 are spaced a substantial distance apart while the air gaps between the rotor teeth and the stator teeth are relatively small. With this arrangement and the use of a permanent magnet having a reversible permeability of about 1, only a few lines of force of the alternating field pass between the stator teeth 14 and 20. It is therefore apparent that this invention affords exceedingly high operating efficiencies.

Inasmuch as the permanent magnet of this motor may be magnetized before mounting, since it is largely insensitive to demagnetizing influences, the manufacturing process is greatly simplified. For the same reason, the motor can be disassembled for maintenance and repair without adversely affecting the permanent magnets.

While only certain embodiments of the invention have been illustrated and described, it is apparent that other modifications, alterations and changes may be made without departing from the true scope and spirit thereof, as defined by the appended claims.

What is claimed is:
1. A self-starting synchronous motor comprising a stator having two sets of stator poles disposed in spaced relationship, an exciter coil surrounding said stator and poles, at least one rotor having two sets of poles cooperating with said sets of stator poles and rotatable about a central axis, at least two permanent magnets polarizing said rotor and rotor poles, one of said magnets being carried by said rotor and the other of said magnets being carried by said stator, said magnets having a high coercive force and a reversible permeability of at least approximately 1.

2. A self-starting synchronous motor according to claim 1 wherein said permanent magnets are axially magnetized.

3. A self-starting synchronous motor according to claim 2 wherein said rotor comprises a disk having a plurality of tooth-like pole pieces extending from the periphery thereof in a direction parallel to the axis of rotation.

4. A self-starting synchronous motor according to claim 1 wherein said rotor comprises a disk having a plurality of tooth-like pole pieces extending from the periphery therof in a direction parallel to the axis of rotation.

5. A self-starting synchronous motor according to claim 1 wherein at least one of said permanent magnets is radially polarized to produce substantially uniform flux throughout its circumference.

6. A self-starting synchronous motor according to claim 1 wherein said rotor comprises a pair of disks each carrying a plurality of tooth-like poles about its periphery and extending in a direction parallel to the axis of rotation, said disks being secured one to the other with the poles of one disk being offset from the poles of the other disk by an angle corresponding to half the angular spacing of the poles.

7. A self-starting synchronous motor according to claim 6 wherein at least one of said permanent magnets is radially polarized.

8. A self-starting synchronous motor according to claim 1 wherein said permanent magnets are disposed on opposite sides of said rotor.

9. A self-starting synchronous motor according to claim 8 wherein said rotor includes a circular band of magnetic material having a plurality of slots formed in each edge thereof to provide two sets of tooth-like poles with the teeth of one set being offset from the teeth of the other set.

10. A self-starting synchronous motor according to claim 1 wherein said stator poles are beveled on one side.

11. A self-starting synchronous motor comprising a stator having two sets of stator poles disposed in spaced relationship, an exciter coil surrounding said stator and poles, at least one rotor having two sets of poles cooperating with said sets of stator poles and rotatable about a central axis, at least two permanent magnets polarizing said rotor and rotor poles, one of said magnets being carried by said rotor and the other of said magnets being carried by said stator, said magnets having a high coercive force and a reversible permeability of at least approximately 1, and said rotor being formed of a circular band of material having spaced slots formed in each edge thereof to provide two sets of outwardly extending tooth-like poles with the teeth of one set being aligned with the slots between the teeth of the other set.

12. A self-starting synchronous motor according to claim 11 wherein said permanent magnets are axially magnetized.

13. A self-starting synchronous motor according to claim 11 wherein said stator teeth are beveled on one side.

References Cited in the file of this patent

UNITED STATES PATENTS 2,227,894 Elms _____ Jan. 7, 1941
2,589,999 Feiertag et al. _____ Mar. 18, 1952